United States Patent [19]
Marshall

[11] 3,783,259
[45] Jan. 1, 1974

[54] APPARATUS FOR RESOLVING A COMPLEX A.C. VOLTAGE OR CURRENT INTO ITS VECTOR COMPONENTS

[75] Inventor: Neil A. Marshall, San Jose, Calif.

[73] Assignee: International Telephone and Telegraph Corporation, New York, N.Y.

[22] Filed: Oct. 20, 1972

[21] Appl. No.: 299,638

[52] U.S. Cl............... 235/186, 235/189, 235/194
[51] Int. Cl. .................... G06g 7/16, G06g 7/22
[58] Field of Search................ 235/186, 189, 197, 235/194; 328/160, 165, 166, 167; 324/140, 141, 142, 60

[56] References Cited
UNITED STATES PATENTS

| | | | |
|---|---|---|---|
| 2,926,852 | 3/1960 | Bennett............................ | 235/189 |
| 3,358,129 | 12/1967 | Schultz............................ | 235/194 |
| 3,439,270 | 4/1969 | Rehm........................ | 324/140 R X |
| 3,473,011 | 10/1969 | Schmid......................... | 235/189 X |
| 3,676,660 | 7/1972 | Miller......................... | 235/189 X |

*Primary Examiner*—Joseph F. Ruggiero
*Attorney*—C. Cornell Remsen, Jr. et al.

[57] ABSTRACT

A method and system which may be employed to, for example, produce a D.C. voltage or current directly proportional to I cos $\phi_a$ or I sin $\phi_a$, where I is the peak A.C. current through a load, and $\phi_a$ is the phase of the current. Current and voltage analogs of the load current and voltage, respectively, are multiplied. A low pass filter eliminates the A.C. terms of the multiplier output. The D.C. term is directly proportional to I cos $\phi_a$ or I sin $\phi_a$. A ninety degree phase shifter with a single-pole, double-throw switch makes, for example, manual selection of one of the two outputs I COS $\phi_a$ and I sin $\phi_a$ possible. Alternatively, a square or other periodic wave may be used for the voltage analog. In any case, the voltage analog or equivalent has a peak amplitude which may be maintained constant by a variable gain amplifier or by sampling the above breakdown voltage drop across a zener diode. The analog voltage or current of the products I cos $\phi_a$ and I sin $\phi_a$ may be read on a D.C. voltmeter or milliammeter, respectively, calibrated in current.

13 Claims, 3 Drawing Figures

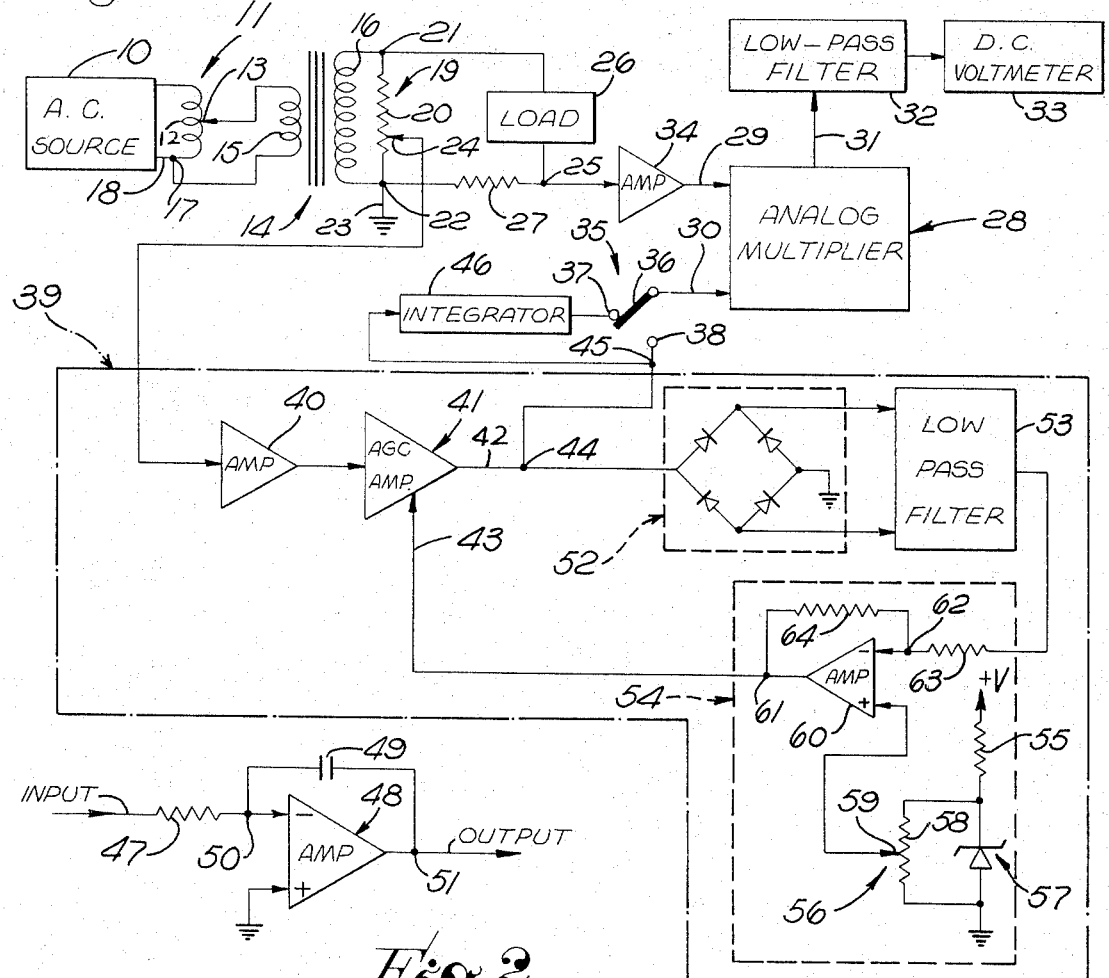
Fig. 1.
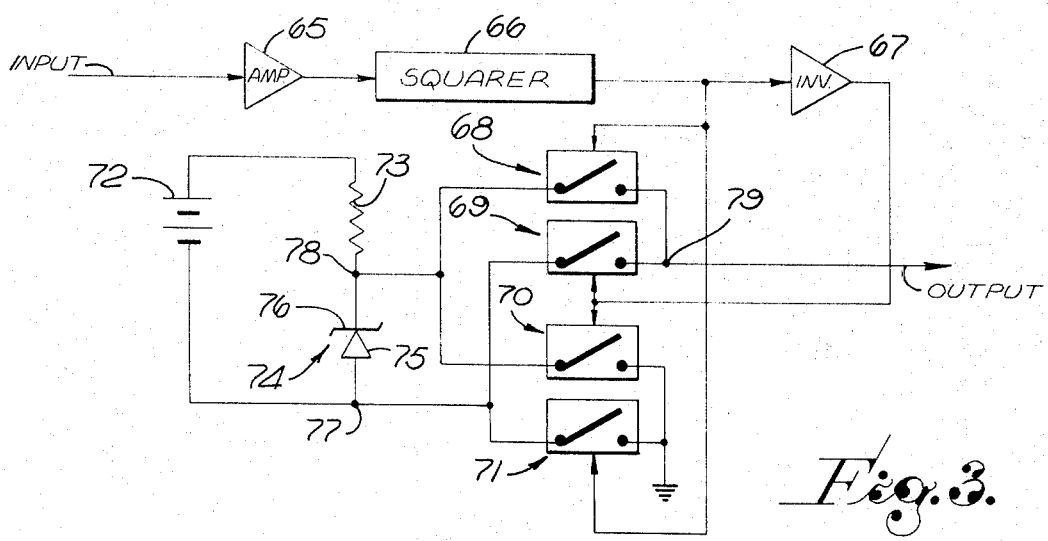
Fig. 2.
Fig. 3.

APPARATUS FOR RESOLVING A COMPLEX A.C. VOLTAGE OR CURRENT INTO ITS VECTOR COMPONENTS

BACKGROUND OF THE INVENTION

This invention relates to the art of vector resolution, and more particularly, to methods of and systems for producing output signals directly proportional to the vector components of a complex A.C. voltage or current.

In the past it has been difficult to resolve accurately and simply an A.C. vector load current into its reactive and resistive current components.

SUMMARY OF THE INVENTION

In accordance with the method and apparatus of the present invention, the above-described and other disadvantages of the prior art are overcome by multiplying a sine or cosine wave times one or more other sine or cosine waves.

By removing the A.C. terms from the product, a D.C. term is derived which is directly proportional to $I \cos \phi_a$ or $I \sin \phi_a$ where $I$ is the peak load current and $\phi_a$ is the phase thereof.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a block diagram of one embodiment of the present invention;

FIG. 2 is a schematic diagram of one of the blocks shown in FIG. 1; and

FIG. 3 is a block diagram of an alternative embodiment of the present invention.

DESCRIPTION OF THE PREFERRED EMBODIMENTS

In accordance with the present invention, it has been discovered that an output signal may be developed that is directly proportional to either the resistive current or to the reactive current through a load under test by multiplying the amplitude A of a signal directly proportional to load current times the amplitude B of a periodic signal, and detecting only the D.C. term of the product, where $$A = K_a \sin(\omega t + p\pi/2 + \phi_a) \text{ and} \tag{1}$$

$$B = K_{b0} + K_{b1} \sin[(\omega t + q\pi/2) + \phi_{b1}]$$
$$+ K_{b2} \sin[2(\omega t + q\pi/2) + \phi_{b2}]$$
$$+ K_{b3} \sin[3(\omega t + Q\pi/2) + \phi_{b3}]$$
$$\ldots K_{bn} \sin[n(\omega t + q\pi/2) + \phi_{bn}] \tag{2}$$

at least one of the odd harmonic constants $K_{b1}, K_{b3} \ldots K_{bn}$ being greater or less than zero, and where $K_a$ is a constant, $$\omega = 2\pi f$$

$f$ is frequency, $\pi$ is 3.1416, $t$ is time, $\phi_a$ is the phase of the load current, $p$ is any positive integer, $q$ is any positive integer, $K_{b0}, K_{b1}, K_{b2}, K_{b3} \ldots K_{bn}$ are constants, and $\phi_{b1}, \phi_{b2}, \phi_{b3} \ldots \phi_{bn}$ are constants.

The constant $\phi_{b1}$ may be assumed to be equal to zero for all purposes herein.

When the sum of p and q is even, the D.C. term of the product AB is directly proportional to the product $I \cos \phi_a$, where I is the peak value of the load current.

When the sum of $p$ and $q$ is odd, the D.C. term of the product AB is directly proportional to the product $I \sin \phi_a$.

In FIGS. 1 and 3, p is even.

In FIG. 1, $K_{b0}, K_{b1}, K_{b2}, K_{b3} \ldots K_{bn}$ are all equal to zero except $K_{b1}$. In FIG. 1, q is odd when the switch pole is connected to the contact which, in turn, is connected from the output of the integrator. When the switch is in the other position thereof, q is even.

In FIG. 3, $K_{b0}, K_{b1}, K_{b2}, K_{b3} \ldots K_{bn}$ all have values larger than zero except $K_{b0}$. In this case. $K_{b0} = 0$. However, this embodiment will operate just as well when $K_{b0} \neq 0$.

A detailed proof for the embodiment of FIG. 1 follows:

If $p = 4$, $$A = K_a \sin(\omega t + \phi_a) \tag{3}$$

If $q = 4$, $$B = K_{b1} \sin \omega t \tag{4}$$

$$AB = K_a K_{b1} \sin^2 \omega t \cos \phi_a + K_a K_{b1} \sin \omega t \cos \omega t \sin \phi_a \tag{5}$$

$$AB/K_a K_{b1} = (1 - \cos 2\omega t/2) \cos \phi_a + \sin 2\phi t \sin \phi_a/2 \tag{6}$$

from the trignometric identity $$\sin^2 \omega t = 1 - \cos 2\omega t/2 \tag{7}$$

Thus, $$2AB/K_a K_{b1} = (1 - \cos 2\omega t) \cos \phi_a + \sin 2\omega t \sin \phi_a \tag{8}$$

$$2AB/K_a K_{b1} = \cos \phi_a - \cos 2\omega t \cos \phi_a + \sin 2\omega t \sin \phi_a \tag{9}$$

$$2AB/K_a K_{b1} = \cos \phi_a - \cos(2\omega t + \phi_a) \tag{10}$$

If $-\cos(2\omega t + \phi_a)$ is removed by filtering, $$2AB/K_a K_{b1} = \cos \phi_a \quad \text{and} \tag{11}$$

$$AB = (K_a K_{b1}/2) \cos \phi_a$$

Thus, (12) is directly proportional to the resistive current $I \cos \phi_a$ because $K_a$ is directly proportional to $I$.

If equation (3) is true and $q=1$, $$B = K_{b1} \cos \phi t \quad \text{and} \tag{13}$$

$$AB = K_a K_{b1} \sin \omega t \cos \omega t \cos \phi_a + K_a K_{b1} \cos^2 \omega t \sin \phi_a \tag{14}$$

Then, $$2AB/K_a K_{b1} = \sin 2\omega t \cos \phi_a + (1 + \cos 2\omega t) \sin \phi_a \tag{15}$$

$$2AB/K_a K_{b1} = \sin \phi_a + \sin (2\omega t + \phi_a) \tag{16}$$

Again if $\sin (2\omega t + \phi_a)$ is removed by filtering, $$AB = (K_a K_{b1}/2) \sin \phi_a \tag{17}$$

and the product $AB$ is directly proportional to the reactive current $I \sin \phi_a$ because $K_a$ is directly proportional to $I$.

The phrase "sine wave" is hereby defined for use herein and in the claims to mean a wave with an amplitude $C$, where $C$ is of the form $$C = D \sin (\omega t + \phi_0 + r\pi/2)$$

$D$, $\phi_0$ and $r$ being constants, $r$ being any positive integer such that $C$ can be defined in any one of the following four ways:

$$C = D \sin (\omega t + \phi_o)$$
$$C = -D \sin (\omega t + \phi_o)$$
$$C = D \cos (\omega t + \omega_o)$$
$$C = -D \cos (\omega t + \phi_o)$$

In other words, "sine wave" means either sine wave or cosine wave of either algebraic sign.

Equations (11) and (17) may be generalized as follows. The D.C. term of $AB$ is always directly proportional to $$K_a \sin (\phi_a + s\pi/2)$$

where $s$ is a positive integer, $s$ being even when the sum of $p$ and $q$ is odd, $s$ being odd when the sum of $p$ and $q$ is even.

If $s = 1$, $K_a \sin (\phi_a + \pi/2) = K_a \cos \phi_a$
If $s = 2$, $K_a \sin (\phi_a + \pi) = -K_a \sin \phi_a$
If $s = 3$, $K_a \sin (\phi_a + 3\pi/2) = -K_a \cos \phi_a$
If $s = 4$, $K_a \sin (\phi_a + 2\pi) = K_a \sin \phi_a$ In FIG. 3, the fundamental voltage $e_b$ at the output is $$e_b = E_b \sin (\omega t + v\pi)$$

where,
$E_b$ is a constant, and
$v$ is a positive integer,
the voltage $e_t$ between the potentiometer wiper and ground in FIG. 1 being $$e_t = E_t \sin \omega t$$

where $E_t$ is a constant.

The integrator of FIGS. 1 and 2 acts as a $w\pi/2$ phase shifter where $w$ can be any odd integer, but happens to be unity.

In FIG. 1, an A.C. source of potential is illustrated at 10. This source may be a conventional source of 110 volt line voltage, if desired.

An autotransformer 11 is provided having a winding 12 and a movable tap 13. Winding 12 is connected across the output of source 10. A transformer is provided at 14 having a primary winding 15, and a secondary winding 16. A junction 17 is connected from one output lead 18 of source 10 and from one end of winding 12. Secondary 15 is connected from tap 13 to junction 17.

The potentiometer 19 is connected across secondary 16. Potentiometer 19 has a winding 20 connected between junctions 21 and 22. Junction 22 is grounded at 23. Potentiometer 19 has a wiper 24. A junction 25 is also provided. A load 26 is connected between junctions 21 and 25. Load 26 may, for example, be a capacitor to be tested.

A.C. voltage between junctions 21 and 22 may be several kilovolts or more, as desired. The resistance of potentiometer winding 20 may be 1,000 megohms, more or less, as desired. The resistance between potentiometer wiper 24 and junction 22 may be, for example, between 100,000 and 200,000 ohms. A resistor 27 is provided which may similarly have a resistance, for example, of between 105 and 200 ohms. Resistor 27 is connected between junctions 22 and 25.

In accordance with the foregoing, the voltage between junctions 22 and 25 is an A.C. voltage directly proportional to the complex current through load 26.

The voltage between wiper 24 and junction 22 is directly proportional to the A.C. voltage across load 26. Note will be taken that, in general, the resistance of resistor 27 will be negligible in comparison to the impedance of load 26.

An analog multiplier is provided at 28. Multiplier 28 has inputs 29 and 30, and an output 31 connected to a low pass filter 32. The output of low pass filter 32 is connected to a D.C. voltmeter 33 which may be calibrated in current, if desired.

An amplifier 34 is connected from junction 25 to multiplier input 29. A single-pole, double-throw switch 35 is provided having a pole 36 which is engageable either with a contact 37 or a contact 38. Switch 35 is a mode switch. Switch 35 may be actuated manually, if desired. Switch pole 36 is pivoted from multiplier input 30.

An AGC circuit 39 is provided including an amplifier 40 and an AGC amplifier 41 connected in succession in that order from wiper 24 of potentiometer 19 to contact 38. AGC amplifier 41 has a main input 42, a gain control input 43 and an output connected to junctions 44 and 45. An integrator 46 is connected from junction 45 to switch contact 37. Integrator 46 merely acts as a 90 degree phase shifter. Integrator 46 is entirely conventional, as shown in FIG. 2, including a resistor 47, a differential amplifier 48 and a capacitor 49. The integrator of FIG. 2 receives its input to resistor 47, one end of which is connected to junction 50. Junction 50 is connected to the inverting input of amplifier 48. The noninverting input of amplifier 48 is grounded. The output of amplifier 48 is connected to a junction 51. Capacitor 49 is connected between junctions 50 and 51. The output of the integrator shown in FIG. 2 is taken from the junction 51.

In FIG. 1, a signal is impressed upon AGC amplifier gain control input 43 to keep the peak amplitude of the A.C. output of AGC amplifier 41 constant. For this purpose, a full wave rectifier bridge 52 is connected from junction 44 to a low pass filter 53. The output of filter 53 is impressed upon a reference level control circuit 54. Circuit 54 includes a resistor 55, a potentiometer 56 and a zener diode 57. Resistor 55 and diode 57 are connected in series in that order from potential +V to ground.

Potentiometer 56 has a winding 58 and a wiper 59. Winding 58 is connected in parallel with diode 57. A differential amplifier 60 has its noninverting input connected from wiper 59.

Circuit 54 has junctions at 61 and 62. A resistor 63 is connected from the output of filter 53 to junction 62, junction 62 being connected to the inverting input of amplifier 60. A resistor 64 is connected between junctions 61 and 62. Input 43 is connected to junction 61.

As an alternative, the circuit of FIG. 3 may be substituted for AGC circuit 39. In this case, an amplifier 65, a squarer 66 and an inverter 67 are connected in succession in that order from potentiometer wiper 24.

Conventional electronic switches 68, 69, 70 and 71 are provided. Switches 68 and 71 are operated simultaneously by the output of squarer 66. Switches 69 and 70 are operated simultaneously by the output of inverter 67. Switches 68 and 71 are, thus, closed when switches 69 and 70 are open, and vice versa. A D.C. source of potential 72, a resistor 73 and a zener diode 74 are connected in series in a closed loop in that order, the positive pole of source 72 being connected to the upper end of resistor 73. Both diodes 57 and 74 are poled to be back biased. Moreover, the potential +V and the potential of source 72 is sufficiently high to maintain diodes 57 and 74 at breakdown continuously.

As shown in FIG. 3, diode 74 has an anode 75 and a cathode 76 connected respectively from junctions 77 and 78.

Switches 68 and 70 are connected from junction 78 to an output junction 79 and to ground, respectively. The output of the circuit of FIG. 3 is taken from junction 79, which junction 79 is connected to junction 45 and contact 38 in FIG. 1.

OPERATION

In the operation of the embodiment in FIG. 1, pole 36 of switch 35 may be placed in engagement with contact 38. D.C. voltmeter 33 will then read a voltage which is directly proportional to I cos $\phi_a$, where I is the peak current through load 26.

When pole 36 of switch 35 is placed in engagement with contact 37, D.C. voltmeter 33 will read a voltage directly proportional to I sin $\phi_a$.

Multiplier 28 may be an entirely conventional analog multiplier. If desired, multiplier 28 may be a four quadrant voltage multiplier. However, this is not necessary if proper D.C. level shifts are employed.

Each component illustrated in the drawings is entirely conventional, although the combination thereof is new. Thus, AGC circuit 39 may be entirely conventional. Circuit 39 produces an output signal at switch contact 38 which is given by equation (4).

The signal which appears at switch contact 37 is -$K_{b1}$ cos $\omega$t.

The output of amplifier 34 in FIG. 1 is given by equation (3).

From the foregoing, it will also be apparent that the output signal at output junction 79 in FIG. 3 is a square wave. The mark-to-space ratio of the square wave is unity. The positive maximum amplitude of pulses generated is constant throughout the pulse width. The same is true of the negative pulses. The positive pulse amplitude is equal to the negative pulse amplitude.

The word "voltmeter" is hereby defined to include, but not be limited to, a combination of a voltage-to-current converter and a current reading meter connected therefrom, where the voltage-to-current converter would be connected from the output of filter 32 in FIG. 1 in lieu of D.C. voltmeter 33. In this case, the current reading meter may or may not be a milliammeter, if desired. Moreover, it may be a milliammeter adapted to read in substantially larger current values, if desired.

Preferably, low pass filter 53 has a cutoff frequency which is less than f.

Low pass filter 32 may have a cutoff frequency above f but below 2f when the AGC circuit 39 is employed; however, when the circuit of FIG. 3 is employed, preferably low pass filter 32 has a cut off frequency below f.

It will be appreciated that the output signal appearing at output junction 79 in FIG. 3 is a common periodic wave having a harmonic composition, by Fourier analysis, in accordance with equation (2). However, equation (2) by no means is limited to the specific output signal appearing at output junction 79 which has been described. For example, equation (2) describes waves of different configurations than the configuration of the wave which appears at output junction 79.

The apparatus of the present invention may be usefully employed in measuring the reactive and resistive currents through a resistive load. It is useful to test for these currents to determine the capacitance of such a load, and to determine whether or not the capacitor meets specifications. These specifications sometimes include specifications of leakage current, breakdown voltage and so forth.

What is claimed is:

1. A system for vector analysis comprising: first means for producing a signal A defined by $$A = K_a \sin(\omega t + p\pi/2 + \phi_a)$$

where, $K_a$ is the peak amplitude of the signal A, p is any positive integer, $\pi$ is 3.1416, $\phi_a$ is the phase of the signal A, and $$\omega = 2\pi f$$

where f is frequency; second means for producing a signal B defined by $$B = K_{b0} + K_{b1} \sin[(\omega t + q\pi/2 + \phi_{b1}]$$
$$+ K_{b2} \sin[2(\omega t + q\pi/2) + \phi_{b2}]$$
$$+ K_{b3} \sin[3(\omega t + q\pi/2) + \phi_{b3}]$$
$$\ldots K_{bn} \sin[n(\omega t + q\pi/2) + \phi_{bn}]$$

where at least one of the odd harmonic constants $K_{b1}$, $K_{b3} \ldots K_{bn}$ is greater or less than zero, and where q is any positive integer, $K_{b0}$, $K_{b1}$, $K_{b2}$, $K_{b3} \ldots K_{bn}$ are constants, and $\phi_{b1}$, $\phi_{b2}$, $\phi_{b3} \ldots \phi_{bn}$ are constants; a multiplier connected from said first and second means in a manner to receive said signals A and B for producing an output signal directly proportional to the product AB, said product AB being an everywhere continuous function of time t; a low pass filter connected from the output of said multiplier in a manner to receive the output signal thereof, said filter being adapted to attenuate the A.C. terms of the product AB while passing the D.C. term thereof; and utilization means connected from the output of said filter.

2. The invention as defined in claim 1, including a transformer having a primary winding for connection with an A.C. source of potential and a secondary winding, a potentiometer having a winding and a wiper, said potentiometer winding being connected across said secondary winding, first and second junctions connected to opposite ends of said potentiometer winding, a third junction, a current sensing resistor connected between said second and third junctions, said first and third junctions being adapted to have a load impedance connected therebetween, said signal A appearing at said third junction, one of said first and second junctions being connected to a point of reference potential, said second means being connected from said wiper to said multiplier.

3. The invention as defined in claim 2, wherein said utilization device includes a D.C. voltmeter calibrated in current, said filter having a cutoff frequency less than f.

4. The invention as defined in claim 3, wherein said second means includes a variable gain amplifier having a main input, a gain control input and an output, said variable gain amplifier main input being connected from said wiper, said variable gain amplifier output being connected to said multiplier, and third means connected from said variable gain amplifier output to said gain control input thereof to maintain the peak amplitude $K_{b1}$ constant, the constants $K_{b0}$, $K_{b1}$, $K_{b2}$, $K_{b3}$ . . . $K_{bn}$ all being zero except $K_{b1}$.

5. The invention as defined in claim 3, wherein said second means includes third means to impress a pulse train on said multiplier, said pulse train including at least one series of rectangular pulses all of which have the same amplitude and pulse width, said pulses being impressed on said multiplier at a constant pulse repetition frequency equal to f.

6. The invention as defined in claim 5, wherein said pulses have a mark-to-space ratio equal to unity, the fundamental of said pulse train being $e_b$, where $$e_b = E_b \sin(\omega t + v\pi)$$

where, $E_b$ is a constant, and
v is a positive integer, the voltage $e_t$ between said wiper and said point being $$e_t = E_t \sin \omega t$$

where $E_t$ is a constant.

7. The invention as defined in claim 6, wherein said second means includes a squarer and an inverter connected in succession from said wiper, a series circuit including a source of D.C. potential, a resistor and a zener diode, an output junction, first, second, third and fourth switches having first, second, third and fourth actuating inputs, said first and fourth inputs being connected from said squarer, said second and third inputs being connected from the output of said inverter, said diode being poled to be back biased by said D.C. source, said D.C. source having an output voltage sufficiently large to keep said diode above its breakdown voltage, said diode having first and second electrodes connected to fourth and fifth junctions, respectively, said first switch being connected between said fourth and output junctions, said second switch being connected between said fifth and output junctions, said third switch being connected between said fourth junction and said point, said fourth switch being connected between said fifth junction and said point, said output junction being connected to said multiplier.

8. The invention as defined in claim 7, including a w $\pi/2$ phase shifter, where w is any odd integer, a single-pole, double-throw mode switch having a pole connected from one of the inputs to said multiplier, said mode switch having two contacts selectively engageable by said switch pole, said phase shifter being connected from one of said first and second means to one contact, the output of said one means being connected to the other contact, the other of said first and second means being connected to the other one of said multiplier inputs.

9. The invention as defined in claim 2, wherein said second means includes a variable gain amplifier having a main input, a gain control input and an output, said variable gain amplifier main input being connected from said wiper, said variable gain amplifier output being connected to said multiplier, and third means connected from said variable gain amplifier output to said gain control input thereof to maintain the peak amplitude $K_{b1}$ constant, the constants $K_{b0}$, $K_{b1}$, $K_{b2}$, $K_{b3}$ . . . $K_{bn}$ all being zero except $K_{b1}$.

10. The invention as defined in claim 9, including a w $\pi/2$ phase shifter, where w is any odd integer, a single-pole, double-throw mode switch having a pole connected from one of the inputs to said multiplier, said mode switch having two contacts selectively engageable by said switch pole, said phase shifter being connected from one of said first and second means to one contact, the output of said one means being connected to the other contact, the other of said first and second means being connected to the other one of said multiplier inputs.

11. The invention as defined in claim 2, wherein said second means includes third means to impress a pulse train on said multiplier, said pulse train including at least one series of rectangular pulses all of which have the same amplitude and pulse width, said pulses being impressed on said multiplier at a constant pulse repetition frequency equal to f.

12. The invention as defined in claim 2, including a w $\pi/2$ phase shifter, where w is any odd integer, a single-pole, double-throw mode switch having a pole connected from one of the inputs to said multiplier, said mode switch having two contacts selectively engageable by said switch pole, said phase shifter being connected from one of said first and second means to one contact, the output of said one means being connected to the other contact, the other of said first and second means being connected to the other one of said multiplier inputs.

13. The invention as defined in claim 2, including a 2 $\pi/2$ phase shifter, where w is any odd integer, a single-pole, double-throw mode switch having a pole connected from one of the inputs to said multiplier, said mode switch having two contacts selectively engageable by said switch pole, said phase shifter being connected from one of said first and second means to one contact, the output of said one means being connected to the other contact, the other of said first and second means being connected to the other one of said multiplier inputs.

* * * * *